US010279636B2

(12) United States Patent
Mawby et al.

(10) Patent No.: US 10,279,636 B2
(45) Date of Patent: May 7, 2019

(54) UNIFORMITY OF A TIRE USING TOOLING SIGNATURE ANALYSIS

(71) Applicants: William David Mawby, Greenville, SC (US); Jonathan Sauls, Simpsonville, SC (US); James Michael Traylor, Greer, SC (US)

(72) Inventors: William David Mawby, Greenville, SC (US); Jonathan Sauls, Simpsonville, SC (US); James Michael Traylor, Greer, SC (US)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 316 days.

(21) Appl. No.: 14/427,800

(22) PCT Filed: Sep. 28, 2012

(86) PCT No.: PCT/US2012/057864
§ 371 (c)(1),
(2) Date: Mar. 12, 2015

(87) PCT Pub. No.: WO2014/051613
PCT Pub. Date: Apr. 3, 2014

(65) Prior Publication Data
US 2015/0246588 A1 Sep. 3, 2015

(51) Int. Cl.
*B60C 99/00* (2006.01)
*G05B 19/418* (2006.01)
(Continued)

(52) U.S. Cl.
CPC ........ *B60C 99/006* (2013.01); *B29D 30/0633* (2013.01); *G05B 19/41865* (2013.01);
(Continued)

(58) Field of Classification Search
CPC ........ B29D 2030/0635; B29D 30/0633; B29D 2030/0634–2030/0642; B60C 99/006;
(Continued)

(56) References Cited

U.S. PATENT DOCUMENTS 4,969,212 A * 11/1990 Walter .................. G01M 17/06
701/33.4
5,940,787 A * 8/1999 Gelston .............. B23Q 17/0957
324/76.56
(Continued)

FOREIGN PATENT DOCUMENTS

| EP | 1055507 | 11/2000 |
|---|---|---|
| JP | 4193528 | 7/1992 |

(Continued)

OTHER PUBLICATIONS

International Search Report for application No. PCT/US2012/057864 dated Dec. 16, 2012.

*Primary Examiner* — Robert E Fennema
*Assistant Examiner* — Shon G Foley
(74) *Attorney, Agent, or Firm* — Dority & Manning, P.A.

(57) ABSTRACT

Systems and methods for improving the uniformity of a tire by identifying the effects of tooling elements used during tire manufacture on tire uniformity, such as effects resulting from building drum elements, form elements, mold elements, and other tooling elements, are provided. More particularly, a tooling signature of a tooling element can be identified by analyzing a plurality of uniformity waveforms measured for a set of tires manufactured using the tooling element. The tooling signature can be analyzed and used to modify tire manufacture to improve the uniformity of a tire.

15 Claims, 6 Drawing Sheets

(51) Int. Cl.
*B29D 30/06* (2006.01)
*G01M 17/02* (2006.01)

(52) U.S. Cl.
CPC ............... *G05B 19/41875* (2013.01); *B29D 2030/0634* (2013.01); *G01M 17/02* (2013.01); *G05B 2219/32182* (2013.01); *G05B 2219/50055* (2013.01)

(58) Field of Classification Search
CPC ........ G05B 19/41865; G05B 19/41875; G05B 2219/50055; G05B 2219/32182; G01M 17/02
USPC ........................................................ 700/105
See application file for complete search history.

(56) References Cited

U.S. PATENT DOCUMENTS

| | | |
|---|---|---|
| 6,514,441 B1 | 2/2003 | Tanaka |
| 6,701,204 B1 | 3/2004 | Nicholson |
| 6,856,929 B1 | 2/2005 | Mawby |
| 9,120,280 B2 * | 9/2015 | Mawby .............. B29D 30/0633 |
| 2004/0020583 A1 | 2/2004 | Zhu |
| 2004/0122618 A1* | 6/2004 | Suzuki ..................... G07C 3/00 |
| | | 702/181 |
| 2005/0142238 A1 | 6/2005 | Tsujimoto |
| 2006/0123898 A9* | 6/2006 | Zhu ..................... G01M 17/022 |
| | | 73/146 |
| 2012/0035757 A1* | 2/2012 | Mawby .............. B29D 30/0633 |
| | | 700/104 |

FOREIGN PATENT DOCUMENTS

| | | |
|---|---|---|
| JP | 2010-030138 | 12/2010 |
| WO | WO 2010/126516 | 11/2010 |
| WO | WO 2010126516 A1 * | 11/2010 ......... B29D 30/0061 |

* cited by examiner

UNIFORMITY OF A TIRE USING TOOLING SIGNATURE ANALYSIS

FIELD OF THE INVENTION

The present disclosure relates generally to systems and methods for improving tire uniformity, and more particularly to systems and methods for identifying contributions to tire uniformity from tooling elements to obtain uniformity improvement.

BACKGROUND OF THE INVENTION

Tire non-uniformity relates to the symmetry (or lack of symmetry) relative to the tire's axis of rotation in certain quantifiable characteristics of a tire. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity characteristics, or attributes, are generally categorized as dimensional or geometric variations (radial run out (RRO) and lateral run out (LRO)), mass variance, and rolling force variations (radial force variation, lateral force variation and tangential force variation, sometimes also called longitudinal or fore and aft force variation). Uniformity measurement machines often measure the above and other uniformity characteristics by measuring force at a number of points around a tire as the tire is rotated about its axis.

Once tire uniformity characteristics are identified, correction procedures can be performed to account for some of the uniformities by making adjustments to the manufacturing process. Additional correction procedures can be performed to address non-uniformities of a cured tire including, but not limited to, the addition and/or removal of material to a cured tire and/or deformation of a cured tire.

Many different factors can contribute to the presence of uniformity characteristics in tires. For instance, tire uniformity can be affected by the tooling elements that are used in the manufacture of the tires. Exemplary tooling elements can include tire building drums, forms, molds, rollers and other tooling elements. Uniformity contributions from individual tooling elements can be difficult to identify using known uniformity analysis techniques, such as Fourier analysis techniques.

Existing techniques have been used to account for harmonic contributions of tooling elements, such as building drums, in green tire uniformity measurements used to predict after-cure uniformity for a green tire. For example, green tire uniformity waveforms have been analyzed to identify harmonic contributions of tooling elements to harmonic data, such as the first, second, third, and fourth harmonics of measured green tire radial run out. Such techniques do not identify a full tooling signature associated with a tooling element. Moreover, such techniques are typically used to discount uniformity contributions from tooling elements to the measured green tire uniformity waveform, such as building drum radial run out contributions to green tire radial run out measurements performed while the green tire is on the building drum.

Thus, a need exists for a system and method that can accurately identify tooling signatures for tooling elements, such as tooling signatures for individual building drums, forms, molds, rollers, and other tooling elements used in tire manufacture. A system and method that analyzes these identified tooling signatures and uses the identified tooling signatures to improve the uniformity of a tire would be particularly useful.

SUMMARY OF THE INVENTION

Aspects and advantages of the invention will be set forth in part in the following description, or may be apparent from the description, or may be learned through practice of the invention.

One exemplary aspect of the present disclosure is directed to a method for improving the uniformity of tires. The method includes measuring a plurality of uniformity waveforms. Each uniformity waveform is measured for a tire in a set of a plurality of tires. The method further includes analyzing, with a processing device, the plurality of uniformity waveforms to identify a tooling signature for a tooling element used in tire manufacture, such as a building drum element, a form element, a mold element, or other suitable tooling element. The tooling signature includes data, such as a waveform, representative of the tooling effect on a uniformity parameter for a plurality of points about a circumference of the tooling element. The method further includes modifying manufacture of one or more tires based on the tooling signature.

In a particular implementation, analyzing, with a processing device, the plurality of uniformity waveforms to identify a tooling signature for a tooling element used in tire manufacture can include modeling each of the uniformity waveforms as a sum of tooling element terms and non-tooling element terms and estimating coefficients associated with the tooling element terms using a regression analysis or a linear programming analysis. The tooling signature for the tooling element can then be generated based on the estimated coefficients associated with the tooling element terms using, for instance, an analysis of variance (ANOVA) analysis.

Another aspect of the present disclosure is directed to a system for improving the uniformity of tires. The system includes a processor and a computer-readable medium storing computer-readable instructions for execution by the processor. The computer-readable medium can further store a plurality of uniformity waveforms. Each uniformity waveform can be measured for a tire in a set of a plurality of tires. The processor can be configured to execute the computer-readable instructions to cause the processor to perform operations. The operations include analyzing the plurality of waveforms to identify a tooling signature for a tooling element used in tire manufacture, such as a building drum element, a form element, or a mold element.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
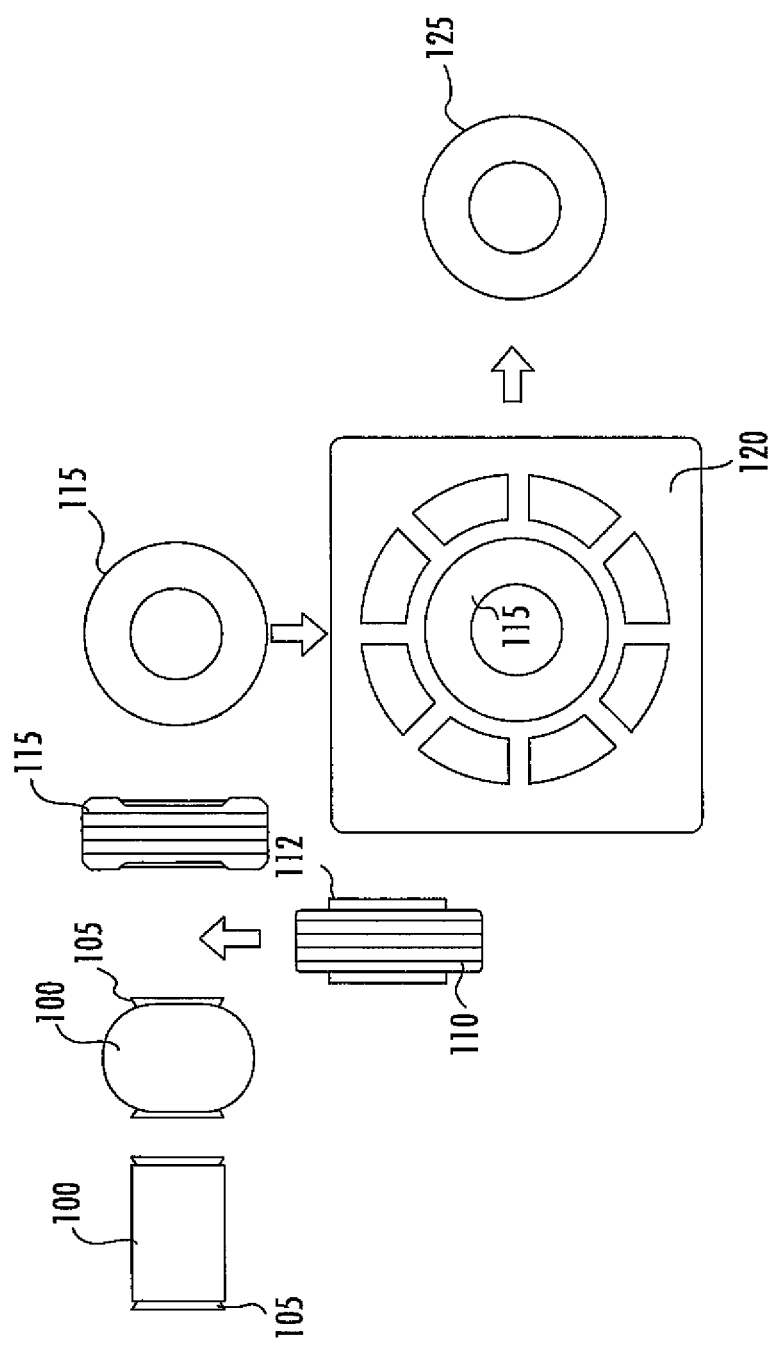
FIG. 1 depicts an overview of an exemplary tire manufacturing process.

It is to be understood by one of ordinary skill in the art that the present discussion is a description of exemplary embodiments only, and is not intended as limiting the broader aspects of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for improving the uniformity of a tire by identifying the effects of tooling elements used during tire manufacture on tire uniformity, such as effects resulting from building drum elements, form elements, mold elements, and other tooling elements used during tire manufacture. More particularly, a tooling signature of a tooling element can be identified by analyzing a plurality of uniformity waveforms measured for a set of tires manufactured using the tooling element. The identified tooling signature of the tooling element includes data, such as a waveform, representative of the contribution of the tooling element to a particular uniformity parameter of a tire for a plurality of data points about a circumference of the tooling signature.

In one embodiment, the tooling signature is identified from a plurality of radial run out (RRO) waveforms measured for the set of tires. Radial run out is a uniformity parameter directed to the physical out of roundness or geometrical non-uniformity of a tire. A tooling signature extracted from a plurality of radial run out uniformity waveforms (i.e. an RRO tooling signature) can provide the contribution of the tooling element to the measured radial run out of a tire for a plurality of points about the circumference of the tooling element. An RRO tooling signature can be a set of data (e.g. a waveform) representative of the physical shape of the tooling element.

In another embodiment, the tooling signature is identified from a plurality of radial force variation (RFV) waveforms measured for the set of tires. Radial force variation (RFV) is a uniformity parameter directed to variations in radial force reacting on a surface in contact with the tire. Radial force variation in a tire can result from variations in the internal tire geometry that lead to variations in the local radial stiffness of the tire. A tooling signature extracted from a plurality of radial force variation uniformity waveforms according to aspects of the present disclosure (i.e. an RFV tooling signature) can be data (e.g. a waveform) that provides the contribution of the tooling element to the measured radial force variation of a tire for a plurality of points about the circumference of the tooling element.

The present disclosure will be discussed with reference radial run out and radial force variation uniformity parameters for purposes of illustration and discussion. Those of ordinary skill in the art, using the disclosures provided herein, should understand that the subject matter of the present disclosure is equally applicable to other uniformity parameters, such as lateral run out, lateral force variation, balance, tangential force variation or other suitable uniformity parameter.

According to a particular aspect of the present disclosure, a tooling signature can be identified by modeling each of a plurality of uniformity waveforms as a sum of tooling element terms and non-tooling element terms. The tooling element terms can be associated with harmonics resulting from tooling elements used during tire manufacture. The non-tooling element terms can be associated with all other harmonics (whether tire harmonics or process harmonics) that can contribute to the uniformity of the tire. Coefficients associated with the tooling element terms can be estimated using a regression analysis or a linear programming analysis. The tooling signature can then be generated based on the estimated coefficients associated with the tooling element terms using, for instance, an analysis of variance analysis (ANOVA analysis). In this manner, the tooling signature can be extracted from tire uniformity waveform data without having to physically measure the uniformity parameter, such as radial run out, associated with the tooling element, saving time and effort resulting from process interruptions. This is particular advantageous in the case of identifying contribution to radial force variation associated with a tooling element as no such physical measurement is even possible.

Extracting the tooling signature of tooling elements used in tire manufacture can lead to improvement in tire manufacture and tire uniformity. For example, tooling elements are characterized by their relatively fixed shapes that are not expected to change significantly during usage. As a result, it is expected that the influence of a particular tooling element on tire uniformity will be relatively constant unless some appreciable change in the tooling element occurs. In this regard, a tooling signature can be analyzed to identify the need to trigger a maintenance event for the tooling element. The consistency of the tooling signatures also makes tooling elements ideal candidates for a dynamic uniformity compensation method, such as a green tire uniformity compensation method. In addition, identified tooling signatures can be used in the design of tooling elements to provide improved uniformity.

FIG. 1 depicts a simplified depiction of the tire manufacturing process. A tire carcass 100 is formed on a building drum element 105. In a unistage manufacturing process, the carcass 100 remains on the drum element 105. In a two-stage process, the carcass 100 would be removed from the drum element 105 and moved to a second stage finishing drum element. In either case, the carcass is inflated to receive a finished tread band 110 to produce a finished green tire 115. The tread band 110 can be built on a form tooling element 112 before the tread band 110 is combined with the carcass to produce the finished green tire 115. The green tire 115 can then be loaded into a curing mold element 120 and cured to produce a cured tire 125.

Uniformity measurements of various uniformity parameters can be performed on the tire using uniformity measurement machines at various stages during the tire manufacturing process. For instance, the radial run out of the green tire 115 can be measured before loading the green tire 115 into the curing mold 120. The radial force variation of the cured tire 125 can be measured after the cured tire has been cured in the curing mold 120. An exemplary system for performing uniformity measurements and analyzing uniformity parameters will be discussed in more detail with reference to FIG. 9.

Tooling elements, such as the building drum element 105 and the curing mold element 120 of FIG. 1, can have an effect on the uniformity of a tire. To identify such effects, a plurality of uniformity waveforms for a set of tires can be analyzed to identify the tooling signature of various tooling elements used in tire manufacture from the uniformity waveforms.

Figure 2:
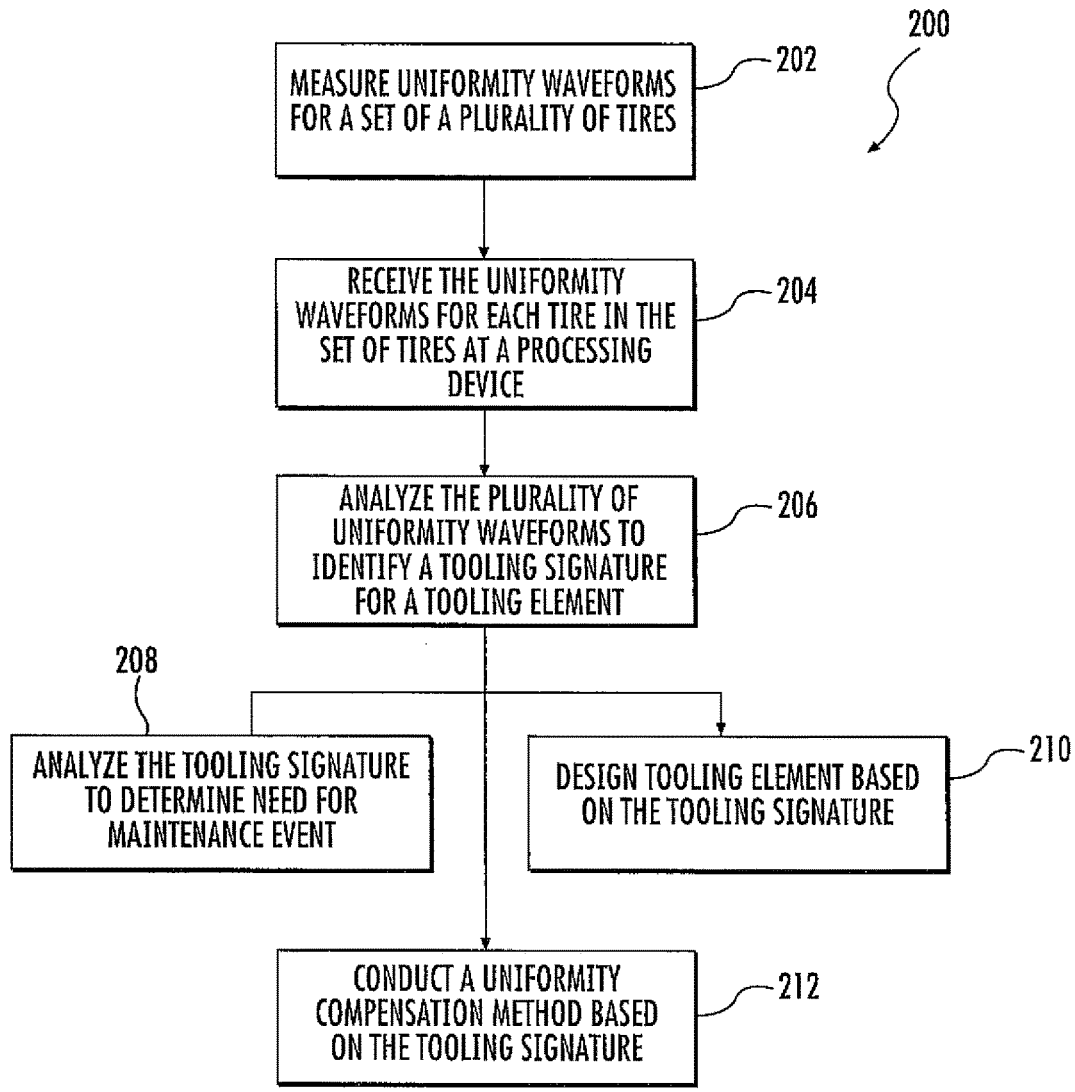
FIG. 2 depicts a flow chart of an exemplary method according to an exemplary embodiment of the present disclosure.

FIG. 2 depicts a flow diagram of an exemplary method 200 for identifying the tooling signatures of tooling elements from a plurality of uniformity waveforms measured for a set of tires according to an exemplary embodiment of the present disclosure. Although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (202), the method includes measuring a plurality uniformity waveforms for a set of a plurality of tires. The measured uniformity waveforms can be associated with a uniformity parameter for the tires. For instance, the uniformity waveforms can correspond to uniformity parameters such as RRO, RFV, lateral run out (LRO), lateral force variation (LFV), balance, tangential force variation (TFV) or other suitable parameter.

The uniformity waveforms are measured for each tire in the set of the plurality of tires. To properly identify the tooling signature from the uniformity measurements, the set of the plurality of tires should include multiple tires manufactured using the same tooling element. The number of tires in the set of the plurality of tires should be selected such that there are a sufficient number of measured uniformity waveforms to perform the statistical analysis techniques disclosed herein to identify tooling signatures. It has been discovered that analysis of uniformity waveforms for a set of about 200 tires to about 800 tires can yield comprehensive tooling signatures for many different tooling elements used in a typical tire manufacturing process. A reduced number of tires can be used provided proper combinations of tooling elements are provided.

The measured uniformity waveforms typically correspond to waveforms constructed from a number of data points measured at equally spaced angular locations during one rotation of a tire (e.g. 128, 256, 512, or other suitable number of data points). For instance, a measured uniformity parameter (U) can be obtained at a plurality of equally spaced data points N around a tire such that measurements are obtained at data points $U_n$, for n=1, 2, . . . , N.

Figure 3:
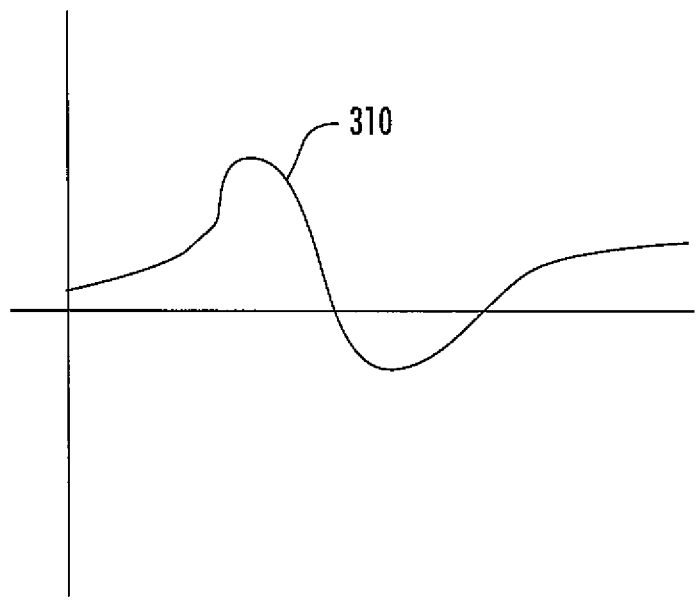
FIG. 3 depicts an exemplary radial run out uniformity waveform measured for a tire.
Figure 4:
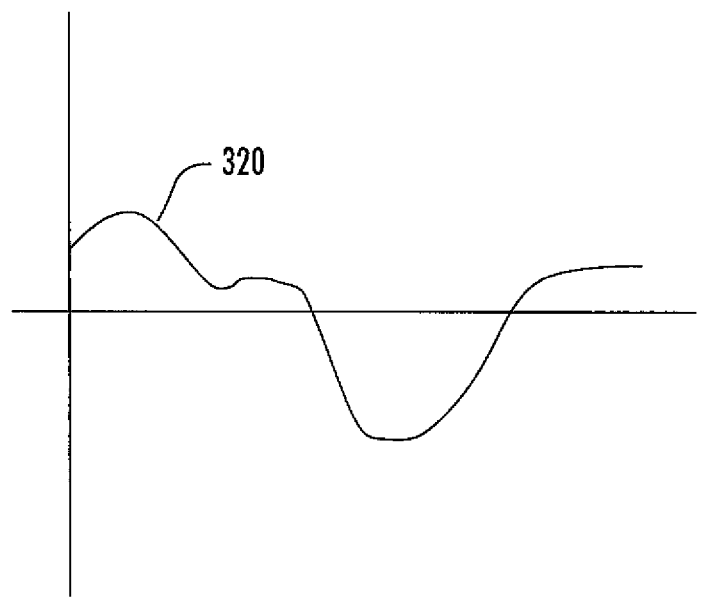
FIG. 4 depicts an exemplary radial force variation uniformity waveform measured for a tire.

FIG. 3 depicts an exemplary schematic of a measured RRO waveform 310 for a tire. The abscissa represents the circumference of the tire and the ordinate represents the radial run out variations for a plurality of points about the circumference of the tire. FIG. 4 depicts an exemplary schematic of a measured RFV waveform 320 for a tire. The abscissa represents the circumference of the tire and the ordinate represents the radial force variations.

It should be appreciated that the uniformity waveforms can be obtained under a variety of conditions. For instance, the uniformity waveforms can be measured before cure (e.g. an RRO waveform) or after cure (e.g. an RFV waveform) of a tire. A uniformity waveform obtained after cure of the tire will be referred to as an after cure uniformity waveform. A uniformity waveform obtained before cure of the tire will be referred to as a before cure uniformity waveform. The uniformity waveforms can be obtained for rotation of the tire in either direction (direct and/or indirect). In addition, the uniformity waveforms can be obtained under loaded or unloaded conditions.

It should also be appreciated that the actual data points $U_n$ of the uniformity waveform may be conditioned in accordance with a variety of known techniques. For instance, the $U_n$ values may be obtained at more than just a single rotation of a tire by averaging the obtained values at each data point during multiple rotations of the tire. In another example, the $U_n$ values may be conditioned by subtracting out the average magnitude value of the measured uniformity parameter across all respective data points such that the composite data waveform is centered around an origin of reference.

Referring to FIG. 2 at (204), the method includes receiving the uniformity waveform for each tire in the set of the plurality of tires at a processing device, such as the processor of a computing device. The processing device can be configured to perform the exemplary analysis techniques discussed herein to identify a tooling signature for a tooling element used in tire manufacture. An exemplary processing device will be discussed with reference to FIG. 9 below. The uniformity waveforms can be received from any suitable device or component across any suitable interface. For example, the uniformity waveforms can be received from a uniformity measurement machine at a computing device across a network.

At (206) the method includes analyzing, with the processing device, the plurality of uniformity waveforms to identify a tooling signature for at least one tooling element. In one particular aspect, each of the plurality of uniformity waveforms can be modeled using a mathematical model. The mathematical model can include a sum of tooling element terms and a non-tooling element terms. The tooling element terms can be associated with the effects attributable to different tooling elements used to manufacture the tire corresponding to a particular waveform. The non-tooling element terms can be associated with other effects that are not associated with tooling elements, such as any process or tire harmonics, Coefficients associated with the tooling element terms can be estimated using a regression or programming analysis. The coefficients can then be used to generate the tooling signature for the tooling element using the identified coefficients.

Figure 5:
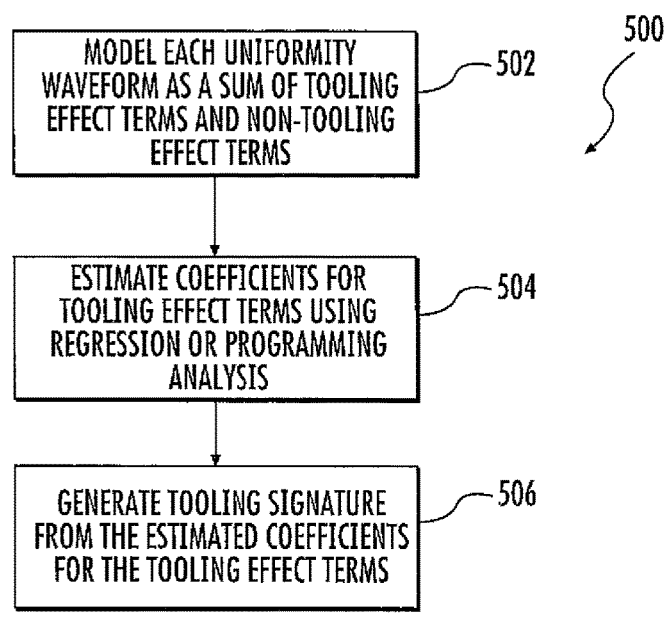
FIG. 5 depicts a flow diagram of an exemplary method for identifying a tooling signature from a plurality of uniformity waveforms measured for a set of a plurality of tires according to an exemplary embodiment of the present disclosure.

FIG. 5 illustrates a flow diagram of an exemplary method 500 for analyzing the plurality of uniformity waveforms to identify a tooling signature for at least one tooling element according to an exemplary embodiment of the present disclosure. At (502), the method includes modeling each uniformity waveform in the plurality of uniformity waveforms as a sum of tooling effect terms and non-tooling effect terms. In one particular implementation, each point $w_i$ of N total points (e.g. 128 total points) for a particular uniformity waveform can be modeled as a sum of Q tooling element harmonics and P non-tooling element harmonics using the following mathematical model:

$$w_i = \sum_{q=1}^{Q} a_q \cos(2\pi i q/N) + b_q \sin(2\pi i q/N) +$$

$$\sum_{p=1}^{P} a_p \cos(2\pi i q/N) + b_p \sin(2\pi i q/N) + \varepsilon_i$$

where i is the particular waveform point, $a_q$ and $b_q$ are coefficients associated with the Q tooling element terms, and $a_p$ and $b_p$ are coefficients associated with the P non-tooling element terms.

In a variation of this particular implementation, the Q tooling effects can be further partitioned by specific tooling elements. In particular the Q tooling element terms can be partitioned into a separate term for each of a plurality of tooling elements used in the manufacture of a tire in the set of a plurality of tires. For instance, each Q term can be further partitioned into a sum of $Q_c$ terms attributable to a first stage building drum harmonics, $Q_m$ terms for second stage building drum harmonics, $Q_f$ terms for form tooling element harmonics, and $Q_p$ terms for curing mold harmonics. Each of the above subsets can have any number of active harmonics and these harmonics can be strict Fourier frequencies or other intermediate frequencies depending on the performance of the tooling element. Each of the above subsets will also have a set of coefficients modifying the harmonic terms. For example, the $Q_c$ terms can have coefficients $a_{qc}$ and $b_{qc}$ modifying sine and cosine terms respectively. The $Q_m$ terms can have coefficients $a_{qf}$ and $b_{qf}$ modifying sine and cosine terms respectively. The $Q_f$ terms can have coefficients $a_{qf}$ and $b_{qf}$ modifying sine and cosine terms respectively. The $Q_p$ terms can have coefficients $a_{qp}$ and $b_{qp}$ modifying sine and cosine terms respectively.

At (504), the coefficients in the mathematical model are estimated using a regression or a programming analysis. Under a regression approach, coefficients are determined to best fit the mathematical model to the data points in the measured uniformity waveform. For instance, the regression analysis will solve for the $a_q$ and $b_q$ coefficients associated with the Q tooling element terms (or any coefficients $a_{qc}$, $b_{qc}$, $a_{qm}$, $b_{qm}$, $a_{qf}$, $b_{qf}$, $a_{qp}$, $b_{qp}$ associated with any subsets), and the $a_p$ and $b_p$ coefficients associated with the P non-tooling element terms such that the mathematical model best fits the data points of the uniformity waveform. Under a programming approach, the coefficients are estimated to minimize the difference or error between the measured uniformity waveform data point and an estimated data point using a model. The coefficients can be estimated using a linear, quadratic or other suitable programming approach.

Once all of the coefficients have been estimated for each uniformity waveform in the plurality of uniformity waveforms for the set of tires, a tooling signature can be generated from the estimated coefficients (506). More particularly, the coefficients associated with the tooling element terms for each measured uniformity waveform can be used to generate a comprehensive tooling signature for a tooling element used in the tire manufacturing process. To construct these tooling signatures, an analysis of variance (ANOVA) analysis technique can be performed in which waveform points for the tooling signature are fitted by a set of N offsets with N being the number of data points for the waveform, such as 128 data points.

To perform this ANOVA analysis technique, there must be multiple measured uniformity waveforms for tires manufactured using the same tooling element. An exemplary mathematical statement of the ANOVA method for a building drum tooling element is provided below:

$$w_{ji} = \alpha + \sum_{q=1}^{Q_c} \sum_{i=1}^{N} \beta_{qi} + \varepsilon_{ji}$$

The $w_{ji}$ is the ith waveform point for the jth tire. $\alpha$ is a constant term or intercept. $\beta_{qi}$ is a fitted constant for each point of the waveform (1 to N) and each tooling element q. The $\beta_{qi}$ terms are determined based on the estimated coefficients determined during the regression or programming analysis. The ANOVA analysis can determine the $\beta_{qi}$ terms using a least squared analysis. In particular, a set of $\beta_{qi}$ terms can be selected to minimize the sum of squared errors across all waveform points.

There are in general N such $\beta$ terms for each of the tooling elements that are fitted. In particular, this formulation allows for N (e.g. 128) possible unique coefficients (one for each of the waveform points) for each of the tooling elements. These N unique coefficients provide the data points for the comprehensive tooling signature for a tooling element. The ANOVA analysis technique is suitable for tooling elements where the relative location of the tooling element is held constant for multiple tires manufactured using the tooling element.

Figure 6:
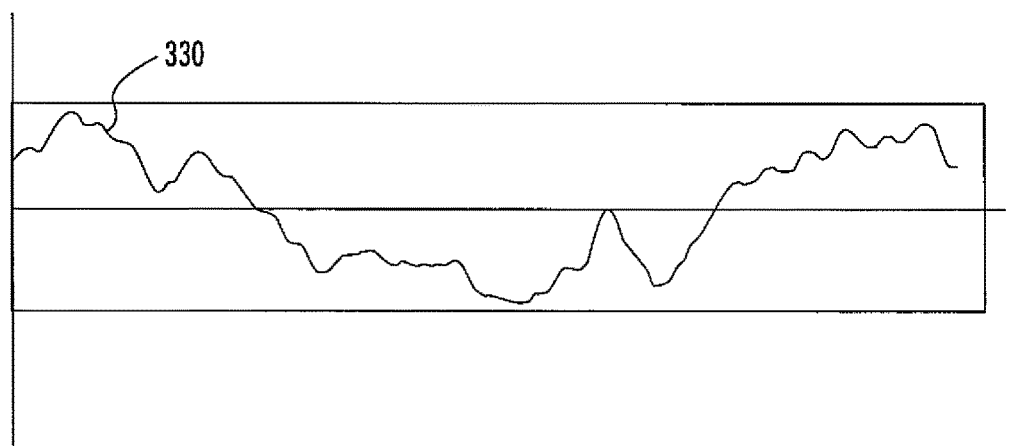
FIG. 6 depicts an exemplary radial run out tooling signature identified from a plurality of radial run out uniformity waveforms measured for a set of a plurality of tires according to an exemplary embodiment of the present disclosure.
Figure 7:
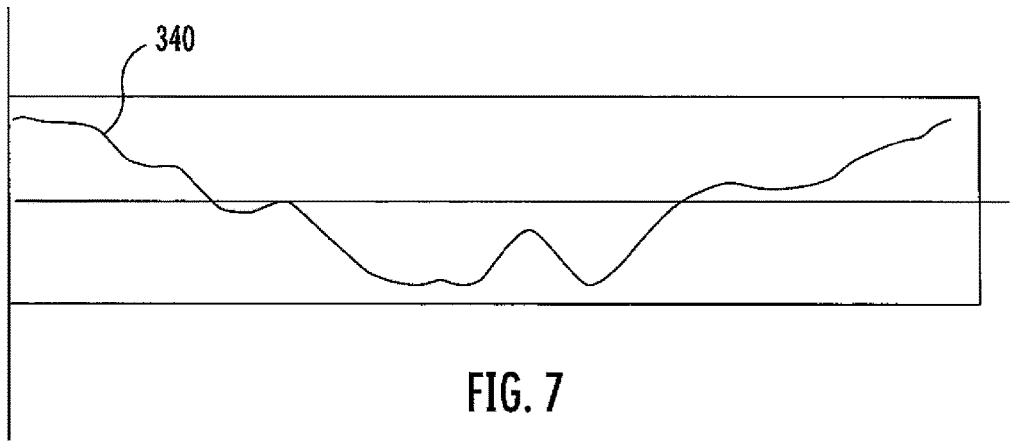
FIG. 7 depicts an exemplary radial force variation tooling signature identified from a plurality of radial force variation uniformity waveforms measured for a set of a plurality of tires according to an exemplary embodiment of the present disclosure.

FIGS. 6 and 7 depict exemplary tooling signatures identified from a plurality of uniformity waveforms according to exemplary aspects of the present disclosure. In particular FIG. 6 depicts an RRO tooling signature 330 for a building drum element identified from a plurality of RRO uniformity waveforms. The RRO tooling signature 330 represents the contribution of the building drum element to the radial run out of a tire at a plurality of points along the circumference of the building drum element. The abscissa represents the circumference of the tooling element and the ordinate represents the radial run out variations for the plurality of points about the circumference of the tooling element. The RRO tooling signature 330 provides an estimate of the physical shape of the building drum element. In this manner, the subject matter of the present disclosure can provide for the indirect identification of the physical shape of a tooling element without having to physically measure the shape of the tooling element.

FIG. 7 depicts an RFV tooling signature 340 for a building drum element identified from a plurality of RFV uniformity waveforms. The RFV tooling signature 340 represents the contribution of the building drum element to the radial force variation of a tire at a plurality of points along the circumference of the building drum element. The abscissa represents the circumference of the tooling element and the ordinate represents the contribution to radial force variations for the plurality of points about the circumference of the tooling element. In this way, the subject matter of the present disclosure provides a technique to identify an RFV tooling signature for a tooling element which cannot be extracted using known physical measurement techniques.

Referring back to FIG. 2, exemplary applications of the identified tooling signature to improve tire manufacture and uniformity will now be set forth. In one embodiment, the method can include analyzing the identified tooling signature to determine a need for a maintenance event or action (208). If a maintenance event is needed, a maintenance action can be performed on the tooling element associated with the identified tooling signature to modify manufacture of one or more tires.

Consider the example where an RRO tooling signature is identified from a plurality of RRO waveforms and represents a point-by-point estimation of the shape of the tooling element. The RRO tooling signature can be analyzed to determine whether the tooling signature exceeds a threshold at one or more points in the plurality of points of the tooling signature. If a point exceeds some threshold away from zero, this could be an indication that some maintenance action needs to be taken to bring the profile back to tolerance. The tooling signature can also be used to direct the maintenance actions to specific locations on the tire since the tooling signature identifies the precise location of the problem areas.

Figure 8:
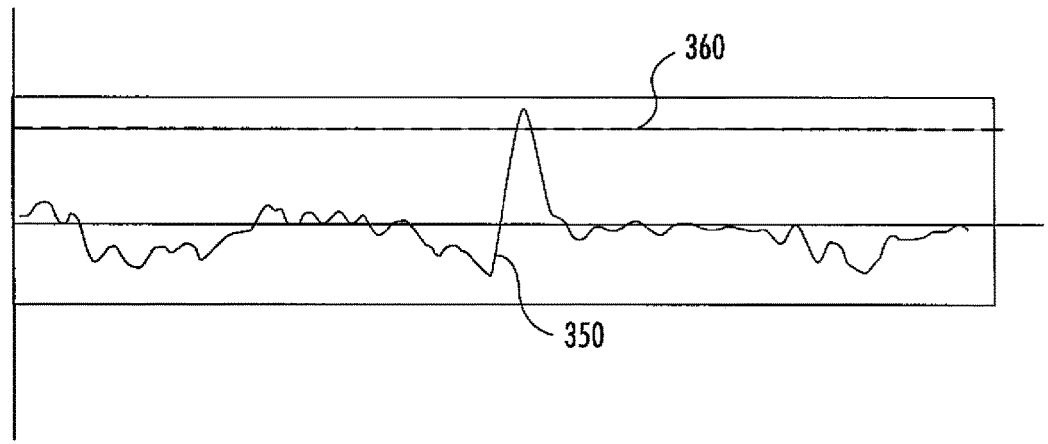
FIG. 8 depicts an exemplary radial run out tooling signature for a building drum element identified from a plurality of radial run out uniformity waveforms according to an exemplary embodiment of the present disclosure.

For example, FIG. 8 depicts an exemplary tooling signature 350 for a building drum element identified from a plurality of RRO uniformity waveforms according to an exemplary embodiment of the present disclosure. As illustrated, portions of the tooling signature 350 exceed the threshold 360. The portions above the threshold 360 can signify the need for a maintenance event. The portions above the threshold 360 also identify the points along the circumference of the tooling element that are in need of maintenance for bringing the tooling element within the threshold tolerance.

Another approach can include comparing a plurality of tooling signatures for a plurality of different tooling elements associated with a common time period to rank the tooling elements for maintenance action. After ranking the tooling elements, the worst of the set of tooling elements can be selected for repair and/or maintenance. The rankings can be based on various parameters of the tooling signatures for the plurality of different tooling elements, such as the peak to peak differential or magnitude of one or more harmonics of the tooling signature. An example ranking of tooling elements using techniques according to embodiments of the present disclosure is discussed below.

Yet another approach can include tracking the tooling signature of a tooling element over time. For example, a tooling signature identified for a tooling element can be compared with a previously obtained tooling signature for the tooling element. Any large changes in the tooling signature over time can be used to trigger a maintenance event. The changes in the tooling signature can include changes of sufficient magnitude in specific data points of the tooling signature or changes in other metrics associated with the tooling signature, such as changes in the peak to peak differential of the tooling signature or changes in the magnitude of various harmonics associated with the tooling signature. Once a change in the tooling signature has been identified, a maintenance action can be performed on the tooling element based on the identified change in the tooling signature.

Referring back to FIG. 2, another broad application of identified tooling signatures is in the design of new tooling elements. In particular, the method can include designing new tooling elements for use in tire manufacture based on the identified tooling signature (210). For example, if the tooling signatures for multiple different tooling elements having the same design are relatively consistent, then the tooling signatures for the tooling elements can be attributable to the design of the tooling element. If the similar tooling signatures for multiple different tooling elements have undesirable features from a uniformity standpoint, a maintenance standpoint, or other standpoint, then a correction can be outlined for the tooling element design itself that can be incorporated into new tooling elements.

In one example, the tooling signature can be subjected to Fourier analysis to extract tooling signature harmonics to see which harmonics are dominant. If the low harmonics are dominant, such as any of the first four harmonics, this can indicate the deleterious impact of low order radial force variation parameters, such as the first harmonic of radial force variation. To remedy this issue, the shape of the tooling element can be designed to mitigate this unwanted effect.

Referring back to FIG. 2 at (212), another application of the tooling signature can include using the identified tooling signature as part of a uniformity compensation method for a tire, such as a green tire uniformity compensation method. An exemplary green tire correction system is disclosed in U.S. Pat. No. 6,865,929, which is incorporated herein by reference for all purposes. A green tire uniformity compensation method typically performs before cure RRO uniformity measurements of one or more components of a green tire. A statistical model is then used to predict the final uniformity of the tire based on the before cure uniformity measurements. The green tire can be reoriented relative to other tire components and/or downstream tooling elements to produce a more uniform tire.

According to aspects of the present disclosure, a uniformity compensation method, such as a green tire uniformity compensation method, can be extended in various ways using tooling signatures identified from a plurality of measured uniformity waveforms. For example, the full tooling signature of a tooling element can be used in the uniformity compensation method in contrast to just an extracted harmonic effect of the tooling element as is known in the art. Using the full tooling signature provides the capability to optimize many different harmonics, as opposed to a single harmonic, by performing a Fourier analysis on the full tooling signature. In addition, the tooling signature can be used to identify the best particular tooling element for a particular situation. For instance, if a green tire is manufactured using a first stage building drum having strong $1^{st}$ and $4^{th}$ harmonics, a curing mold also having strong $1^{st}$ and $4^{th}$ harmonics can be selected to balance the effects resulting from the first stage building drum.

Figure 9:
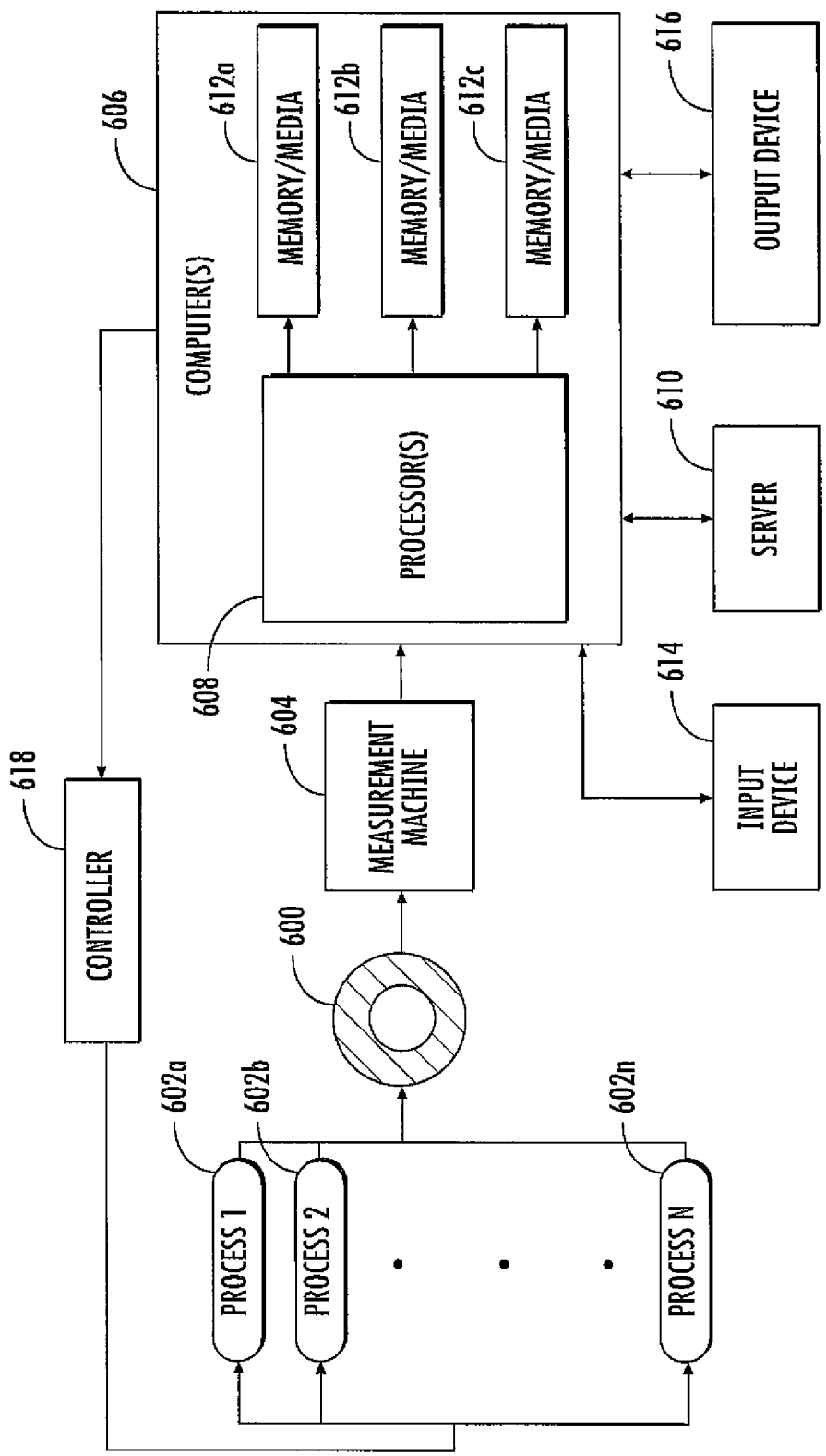
FIG. 9 depicts an exemplary system for identifying a tooling signature from a plurality of uniformity waveforms according to an exemplary embodiment of the present disclosure.

Referring now to FIG. 9, a schematic overview of exemplary hardware components for implementing the above-described method is illustrated. An exemplary tire 600 is constructed in accordance with a plurality of respective manufacturing processes. Such tire building processes may, for example, include applying various layers of rubber compound and/or other suitable materials to form the tire carcass, providing a tire belt portion and a tread portion to form the tire summit block, positioning a green tire in a curing mold, and curing the finished green tire, etc. Such respective process elements are represented as 602*a*, 602*b*, . . . , 602*n* in FIG. 9 and combine to form exemplary tire 600. It should be appreciated that a batch of multiple tires can be constructed from one iteration of the various processes 602*a* through 602*n*. Often, it is such a batch of multiple tires that are measured and tested in accordance with the disclosed uniformity improvement techniques. The multiple model tires can then be analyzed to improve the tire building process for subsequently manufactured tires.

Referring still to FIG. 9, a measurement machine 604 is provided to obtain the various uniformity measurements, such as the uniformity measurements obtained at (202) of FIG. 2. In general, such a measurement machine can include such features as a mounting fixture on which a tire is mounted and rotated centrifugally at one or more speeds. In one example, laser sensors are employed to operate by contact, non-contact or near contact positioning relative to tire 600 in order to determine the relative position of the tire surface at multiple data points (e.g., 128 points) as it rotates about a center line.

The measurements obtained by measurement machine 604 can be relayed such that they are received at one or more computers 606, which may respectively contain one or more processors 608, although only one computer and processor are shown in FIG. 9 for ease and clarity of illustration. Processor(s) 608 may be configured to receive input data from input device 614 or data that is stored in memory 612, including raw measurements of tire parameters. Processor(s) 608, can then analyze such measurements in accordance with the disclosed methods, and provide useable output such as data to a user via output device 616 or signals to a process controller 618. Uniformity analysis may alternatively be implemented by one or more servers 610 or across multiple computing and processing devices.

Various memory/media elements 612*a*, 612*b*, 612*c* (collectively, "612") may be provided as a single or multiple portions of one or more varieties of non-transitory computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. The computing/processing devices of FIG. 9 may be adapted to function as a special-purpose machine providing desired functionality by accessing software instructions rendered in a computer-readable form stored in one or more of the memory/media elements. When software is used, any suitable programming, scripting, or other type of language or combinations of languages may be used to implement the teachings contained herein.

Example

To better appreciate the advantages of identifying tooling signatures for tooling elements used in tire manufacture according to exemplary embodiments of the present disclosure, the results of an exemplary application of the disclosed techniques will now be presented. In particular, a plurality of RRO uniformity waveforms were measured for a set of a plurality of tires. RRO tooling signatures (i.e. tooling signatures identified from RRO waveforms) for seven different building drum elements were identified using the analysis techniques disclosed herein. These tooling signatures were then analyzed to identify peak to peak differentials for each tooling signature. The peak to peak differential (e.g. the difference between the highest and lowest value in the tooling signature) was then used to rank the seven different building drum elements for purposes of selecting building drum elements for maintenance. The results of the ranking for the seven different building drum elements are provided in Table 1 below:

TABLE 1

| Ranking | Building Drum ID No. | Tooling Peak to Peak Differential (RRO) |
|---|---|---|
| 1 | 3003 | 84.3 |
| 2 | 3005 | 132.5 |
| 3 | 3004 | 136.0 |
| 4 | 3002 | 137.8 |
| 5 | 3006 | 160.3 |
| 6 | 3007 | 177.4 |
| 7 | 3001 | 253.1 |

A plurality of RFV uniformity waveforms were also measured for the set of the plurality of tires. RFV tooling signatures (i.e. tooling signatures identified from RFV waveforms) were identified for the same seven different building drum elements discussed above. These tooling signatures were then subjected to Fourier analysis to identify the magnitude of the first harmonic of each tooling signature. The magnitude of the first harmonic was then used to rank the seven different building drum elements for purposes of selecting building drum elements for maintenance purposes. The results of the ranking for the seven different building drum elements are provided in Table 2 below:

TABLE 2

| Ranking | Building Drum ID No. | Tooling Signature First Harmonic (RFV) |
|---|---|---|
| 1 | 3001 | 1.32 |
| 2 | 3002 | 1.47 |
| 3 | 3005 | 1.67 |
| 4 | 3006 | 1.77 |
| 5 | 3004 | 2.16 |
| 6 | 3003 | 2.41 |
| 7 | 3007 | 2.73 |

Table 3 below presents rankings for the seven different building drum elements based on the peak to peak differential of the RFV tooling signatures.

TABLE 3

| Ranking | Building Drum ID No. | Tooling Peak to Peak Differential (RRO) |
|---|---|---|
| 1 | 3005 | 3.26 |
| 2 | 3003 | 3.37 |
| 3 | 3004 | 3.73 |
| 4 | 3006 | 4.17 |
| 5 | 3002 | 4.20 |
| 6 | 3007 | 4.23 |
| 7 | 3001 | 4.86 |

As demonstrated in Tables 1-3, the rankings of seven building drum elements are different depending on the parameter and type of tooling signature used to rank the building drum elements. This can result in different analyses of maintenance performance and parameters using the same dataset of uniformity waveforms.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for improving the uniformity of a tire, comprising:
measuring a plurality of uniformity waveforms, each uniformity waveform measured for a tire in a set of a plurality of tires;
modeling each uniformity waveform of the plurality of uniformity waveforms as a sum of one or more tooling element terms and one or more non-tooling element terms, the one or more tooling element terms associated with a tooling element used in tire manufacture, the one or more non-tooling element terms associated with tire and process harmonics;
identifying a tooling signature for the tooling element used in tire manufacture, the tooling signature based, at least in part, on the one or more tooling element terms; and
modifying manufacture of one or more tires based on the identified tooling signature,
wherein the tooling signature is comprised of data representative of a tooling effect on a uniformity parameter for a plurality of data points about a circumference of the tooling element, and
wherein the tooling signature is comprised of data representative of a point-by-point estimation of a physical shape of the tooling element.

2. The method of claim 1, wherein each of the plurality of uniformity waveforms comprises a radial run out waveform.

3. The method of claim 1, wherein each of the plurality of uniformity waveforms comprises a radial force variation waveform, the tooling signature comprising data representative of the contribution of the tooling element to radial force variation at each point of the plurality of points about the circumference of the tooling element.

4. The method of claim 1, wherein the tooling element comprises a building drum element, a form element, or a mold element.

5. The method of claim 1, wherein the set of a plurality of tires includes 200 tires to 800 tires.

6. The method of claim 1, wherein identifying a tooling signature based at least in part on the one or more tooling element terms comprises:
estimating coefficients associated with the one or more tooling element terms using a regression analysis or a programming analysis; and
generating the tooling signature for the tooling element based on the estimated coefficients associated with the one or more tooling element terms.

7. The method of claim 6, wherein the tooling element terms comprise a separate tooling element term for each of a plurality of tooling elements used in the manufacture of a tire in the set of a plurality of tires.

8. The method of claim 1, wherein modifying manufacture of one or more tires based on the identified tooling signature comprises:
analyzing the tooling signature to determine if a maintenance action for the tooling element is needed,
performing the maintenance action on the tooling element when the maintenance action is needed.

9. The method of claim 8, wherein analyzing the tooling signature to determine if a maintenance action is needed comprises determining whether the tooling signature exceeds a threshold at one or more of the points in the plurality of points.

10. The method of claim 8, wherein analyzing the tooling signature to determine if a maintenance action is needed comprises comparing a first tooling signature for a first tooling element against a second tooling signature for a second tooling element to rank the tooling elements for the maintenance action.

11. The method of claim 8, wherein analyzing the tooling signature to determine if a maintenance action is needed comprises comparing the tooling signature to a previously obtained tooling signature for the tooling element to identify a change in the tooling signature, and performing the maintenance action based on an identified change in the tooling signature.

12. The method of claim 1, wherein modifying manufacture of one or more tires based on the tooling signature comprises designing a tooling element for use in tire manufacture based on the tooling signature.

13. The method of claim 1, wherein modifying manufacture of one or more tires based on the tooling signature comprises designing a tooling element for use in tire manufacture based on the tooling signature.

14. The method of claim 13, wherein using the tooling signature in the uniformity compensation method comprises:
performing a before cure uniformity measurement during manufacture of a tire, and
selecting a downstream tooling element to be used during manufacture of the tire based on the identified tooling signature.

15. The method of claim 10, wherein comparing the tooling signature for the first tooling element against the tooling signature for the second tooling element occurs during a common time period.

* * * * *